(12) United States Patent
Carpy et al.

(10) Patent No.: US 7,665,129 B2
(45) Date of Patent: Feb. 16, 2010

(54) METHOD AND SYSTEM FOR MANAGING ACCESS AUTHORIZATION FOR A USER IN A LOCAL ADMINISTRATIVE DOMAIN WHEN THE USER CONNECTS TO AN IP NETWORK

(75) Inventors: Céline Carpy, Neuilly-sur-Narue (FR); Lionel Morand, Malakoff (FR)

(73) Assignee: France Telcom, Paris (FR)

( * ) Notice: Subject to any disclaimer, the term of this patent is extended or adjusted under 35 U.S.C. 154(b) by 305 days.

(21) Appl. No.: 10/588,707

(22) PCT Filed: Feb. 1, 2005

(86) PCT No.: PCT/FR2005/000206

§ 371 (c)(1),
(2), (4) Date: Jan. 12, 2007

(87) PCT Pub. No.: WO2005/086454

PCT Pub. Date: Sep. 15, 2005

(65) Prior Publication Data

US 2007/0186273 A1  Aug. 9, 2007

(30) Foreign Application Priority Data

Feb. 9, 2004  (EP)  ................... 04290325

(51) Int. Cl.
 *G06F 9/00* (2006.01)
 *G06F 17/00* (2006.01)
 *H04L 29/06* (2006.01)
 *G06F 15/16* (2006.01)
 *G06F 7/04* (2006.01)
 *G06F 17/30* (2006.01)

(52) U.S. Cl. .................... 726/12; 726/5; 726/6; 726/7; 726/8; 709/206

(58) Field of Classification Search .................... 726/5, 726/8, 12, 6, 7; 709/206
See application file for complete search history.

(56) References Cited

U.S. PATENT DOCUMENTS

| 2003/0056096 | A1 | 3/2003 | Albert et al. |
| 2003/0093690 | A1* | 5/2003 | Kemper ..................... 713/201 |
| 2003/0103506 | A1 | 6/2003 | Keller |
| 2003/0236982 | A1 | 12/2003 | Hsu |
| 2004/0210771 | A1* | 10/2004 | Wood et al. ................. 713/201 |
| 2005/0054327 | A1* | 3/2005 | Johnston ..................... 455/411 |
| 2006/0242241 | A1* | 10/2006 | Tock et al. .................. 709/206 |

OTHER PUBLICATIONS

Ala-Laurila J. et al., "Wireless Lan Access Network Architecture for Mobile Operators," IEEE Communications Magazine, IEEE Service Center, Piscataway, NJ, 39(11):82-89 (Nov. 2001).
Cisco, "Double Authentication," CISCO Product Manual, <http://www.cisco.com/univercd/cc/td/doc/product/software/ios112/dbl_auth.pdf>, pp. 65-80, Retrieved: Jun. 2004.
Willens et al., "Remote Authentication Dial In User Service (RADIUS)," Request for Comments, pp. 1-77 (Jun. 2000).

* cited by examiner

*Primary Examiner*—Shin-Hon Chen
(74) *Attorney, Agent, or Firm*—Patterson, Thuenete, Skaar & Christensen, P.A.

(57) ABSTRACT

In order to control the authorisation of a user during an attempt to access an IP transport network (5) by means of an access network (1, 2), a user terminal (11, 12, 13) emits an access request to an access supplier (6, 7, 8), containing data for authenticating the user to the access supplier, and said request is then transmitted to an access server (9) of the access network (1, 2) in view of being addressed to a remote authentication server (15) of the access supplier. On reception of the access request, the access server (9) emits a RADIUS request to a proxy server (10) of the access network (1, 2) which determines whether the user must be locally authenticated, and if this is the case, the proxy server transmits, to the access server (9), a request for authentication data to be addressed to the terminal of the user, and carries out a local procedure to authenticate the user, on the basis of the authentication data supplied by the user.

11 Claims, 3 Drawing Sheets

Fig. 2b

METHOD AND SYSTEM FOR MANAGING ACCESS AUTHORIZATION FOR A USER IN A LOCAL ADMINISTRATIVE DOMAIN WHEN THE USER CONNECTS TO AN IP NETWORK

RELATED APPLICATIONS

This application claims priority to PCT Application No. PCT/FR2005/000206 filed Feb. 1, 2005, and European Application No. 04290325.2 filed Feb. 9, 2004 the disclosures of which are hereby incorporated by reference in their entirety.

This invention relates to the provision of services based on an IP (Internet Protocol) transport, such as the connection to the Internet or telephony over IP.

It applies in particular to architectures based on the RADIUS (Remote Authentication Dial In User Service) protocol, which are widely used in IP networks to manage the access rights of users and the accounting necessary for billing said users for a given administrative domain. In this context, an administrative domain gathers all of the network equipment managed by a single network administrator. These architectures are also used to manage access to networks for users in roaming situations, i.e. connected by a network belonging to a different administrative domain from that on which they are dependent, with the authorization management then being performed between administrative domains.

In the context of architectures enabling access to IP services by means of technologies such as ADSL (Asymmetric Digital Subscriber Line), W (Wireless Local Area Network), and WAP (Wireless Application Protocol), at least two administrative domains participate in the management of access authorization. They are the local administrative domain, i.e. that to which the user connects, and a remote administrative domain, i.e. that of the provider of access to the IP network or services to which the user wants access. In these architectures, the local administrative domain essentially plays the role of intermediary between the user and the administrative domain of the service provider.

The RADIUS protocol, which is essentially designed after the client/server model, makes it possible to manage the access rights of a user of an IP network. In the architectures mentioned above, the user connects first to a local network access server, which server has a RADIUS client in charge of collecting the information provided upon the access request and transmitting said information in an access request message (Access-Request) to an authentication server of the access network, having a RADIUS server. The authentication server ensures the processing of access requests by authenticating the users according to the information that it has, and in response provides either an access authorization in the form of an access acceptance message (Access-Accept) or an access rejection in the form of an access rejection message (Access-Reject) containing the reason for the rejection. The access authorization message contains all of the information needed for the access server to provide the final service to the user, and in particular the information on the access configuration.

In addition to the messages mentioned above, the RADIUS protocol also provides an access challenge message (Access-Challenge) enabling the authentication server to send the access server an unpredictable challenge value Upon receipt of such a message, the access server asks the user to provide it with a response value obtained by applying a predefined algorithm to the challenge value. Upon receipt of this response, the access server transmits, to the authentication server, a new access request message containing the response value. This new access request message is processed by the authentication server, which responds thereto by sending an access acceptance or rejection message, depending on the response value provided by the user. The authentication server can also respond with an access challenge message.

If the authentication server of the access network, called by the access server, does not have the information necessary for processing the access request transmitted by the user, it can address an appropriate authentication server by acting as a RADIUS proxy server, which only retransmits the messages between the access server and another authentication server. It can thus perform the role of routing RADIUS messages that pass through it to a plurality of authentication servers. I can also perform the function of filtering these messages and modifying the contents thereof (by adding, deleting or modifying attributes) without being capable of modifying the nature thereof.

The role of a RADIUS proxy server as stipulated in the RADIUS protocol is therefore very limited. However, such a server may need to perform a tightened inspection on the signaling and possibly activate a local authentication. In particular, such a proxy server is not capable of initiating, upon receipt of an access request message, a challenge/response exchange with a RADIUS client, independently of a remote authentication server.

In numerous applications, it is nevertheless desirable to be capable of authenticating a user not only remotely, but also locally, in particular to be capable of providing the users with additional services at the local level, in addition to access to a public network such as the Internet.

This invention is intended to overcome these disadvantages. This objective is achieved by providing a method for managing the authorization of a user during an attempt to access an IP transport network by means of an access network, which method includes steps in which:
  a user terminal transmits, to an IP service or access provider, an access request containing data for user authentication with the IP service or access provider, which is transmitted by means of an access server of the access network and the IP transport network, so as to be sent to a remote authentication server of the IP service or access provider,
  upon receipt of the access request, the access server transmits a RADIUS request in accordance with the RADIUS protocol to a proxy server of the access network,
  upon receipt of the RADIUS request, the proxy server transmits a request for access authorization to the remote authentication server,
  the remote authentication server executes a user authentication procedure, on the basis of authentication data contained in the access request, and in response transmits, to the proxy server, a response message containing the result of the user authentication procedure.

According to the invention, this method also includes steps in which:
  the proxy server determines, for each RADIUS request, received from the access server and corresponding to an access request transmitted by a user terminal, whether a local authentication of the user transmitting the access request, at the local network level, must be performed,
  if a local authentication of the user must be performed, the proxy server transmits, to the access server, a request for authentication data, which is retransmitted to the user terminal, receives a response message from the user terminal by means of the access server, and executes a procedure for local authentication of the user, on the basis of the authentication data contained in the response message.

According to a preferred embodiment of the invention, the authentication data request transmitted by the proxy server to the user terminal, if a local user authentication must be performed, is a challenge message containing a random number.

Advantageously, the challenge message contains an indication enabling the user terminal to determine whether it concerns a local user authentication.

According to a preferred embodiment of the invention, the remote authentication of the user by the remote authentication server includes steps in which:

- the remote authentication server transmits, to the user, a challenge message containing a random number,
- the proxy server retransmits the challenge message transmitted by the remote authentication server to the user and, in a response message, receives the data for user authentication with the remote authentication server,
- the proxy server retransmits, to the remote authentication server, the response message transmitted by the user terminal,
- the proxy server receives, from the remote authentication server, a message containing the result of the user authentication.

According to a preferred embodiment of the invention, the proxy server determines which access rights to assign to the user on the basis of the result of the local and remote authentications of the user.

The invention also relates to a system for managing authorization of a user during an attempt by a user terminal to access an IP service or access provider by means of an IP transport network, which system includes:

- access networks to which the user terminals are connected,
- IP gateways ensuring the connection, respectively, between the access networks and the IP transport network,
- at least one access server for each access network, designed to transmit, upon request by the user terminals, RADIUS access requests in accordance with the RADIUS protocol,
- at least one remote authentication server for each of the IP service or access providers, designed to authenticate the users on the basis of authentication data contained in the access requests received by the authentication server, and
- a proxy server connected to the IP transport network, designed to retransmit each RADIUS access request, transmitted by one of the access servers upon a user's request, to a remote authentication server of an IP service or access provider indicated in the access request, and to retransmit, to the access servers, the authentication responses provided by the remote authentication servers.

According to the invention, the proxy server includes:

- means for determining, for each RADIUS access request received from an access server upon a user's request, whether or not a local authentication of the user transmitting the access request must be performed at the local network level,
- means for transmitting by way of an access server, to a user terminal that must be locally authenticated, a message requesting authentication data, and for receiving, in response from the user terminal, a response message containing the authentication data requested, and
- means for executing a local user authentication procedure, on the basis of authentication information contained in the response message.

According to a preferred embodiment of the invention, the proxy server also includes means for determining an overall authentication result on the basis of the local user authentication result and the user's authentication response provided by the authentication server, and for retransmitting the overall authentication result to the access server.

According to a preferred embodiment of the invention, each access server includes a RADIUS client and the proxy server includes a client and a RADIUS server, for exchanging messages in accordance with the RADIUS protocol.

According to a preferred embodiment of the invention, the authentication data request message transmitted by the proxy server to locally authenticate the user is a challenge message, wherein the proxy server comprises means for generating a random number that is inserted into the challenge message, and means for verifying the response to the challenge message received from the user terminal.

According to a preferred embodiment of the invention, the proxy server includes means for determining which access rights to assign to the user on the basis of the result of the local and remote authentications of the user.

The invention also relates to a proxy server for authorizing a user terminal connected to an access network to access and IP service or access provider by means of an IP transport network connected to the access network by an IP gateway, wherein the proxy server is connected to an IP transport network and includes means for:

- retransmitting each RADIUS access request in accordance with the RADIUS protocol, transmitted by an access server upon the request of a user terminal, to a remote authentication server of an IP service or access provider indicated in the access request, and
- retransmitting, to the access server, the authentication response provided by the remote authentication server.

According to the invention, the proxy server also includes means for:

- determining, for each RADIUS access request received from an access server upon a user's request, whether or not a local authentication of the user transmitting the access request must be performed at the local network level,
- transmitting, by means of an access server, to a user terminal that must be locally authenticated, a message requesting authentication data, and, in response, receiving from the user terminal a response message containing the authentication data requested, and
- executing a local user authentication procedure, on the basis of the authentication information contained in the response message.

The invention also relates to a computer program intended to be executed by a proxy server designed to authorize a user terminal connected to an access network to access an IP service or access provider by means of an IP transport network connected to the access network by an IP gateway, wherein the proxy server is connected to an IP transport network, which program includes instructions for:

- retransmitting each RADIUS access request in accordance with the RADIUS protocol, transmitted by an access server upon the request of a user terminal, to a remote authentication server of an IP service or access provider indicated in the access request, and
- retransmitting, to the access server, the authentication response provided by the remote authentication server.

According to the invention, the program also includes instructions for:

- determining, for each RADIUS access request received from an access server upon the request of a user, whether or not a local authentication of the user transmitting the access request must be performed at the local network level, transmitting, by means of an access server, to a user terminal that must be locally authenticated, a message requesting authentication data, and, in response, receiving from the user terminal a response message containing the authentication data requested, and executing a local user authentication procedure, on the basis of authentication information contained in the response message.

A preferred embodiment of the invention will be described below, by way of a non-limiting example, in reference to the appended drawings in which.

Figure 1:
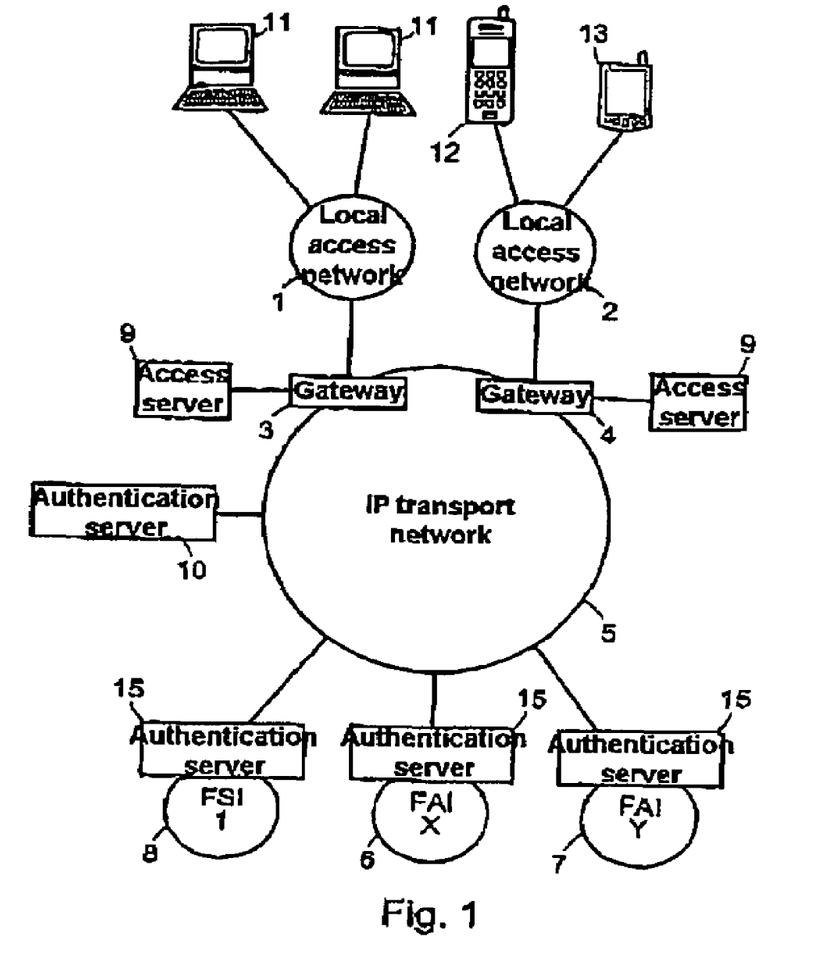
FIG. 1 diagrammatically shows the architecture of a system for providing services based on an IP transport, according to the invention.

The system shown in FIG. 1 includes access networks 1, 2 to which user terminals 11, 12, 13 are connected. These access networks 1, 2 provide the terminals with access to an IP transport network 5 by means of respective IP gateways 3, 4, adapted to the access network, The IP transport network 5 enables the users to access an Internet access provider 6, 7 or an IP service provider 8.

According to the invention this system also includes access servers 9 connected, respectively, to local networks 1, 2 to which the users wanting to access the IP network must connect, and an authentication proxy server 10 connected to the IP transport network 5 and to which each access server 9 transmits the access requests transmitted by the terminals 11, 12, 13.

Each access server 9 is designed to receive all of the requests for access to a service or access provider 6, 7, 8, transmitted by the users on the corresponding local network 1, 2, and to route these requests by means of a gateway 3, 4 through the IP transport network to a service or access provider 6, 7, 8 indicated in the request by the user terminal, wherein each service or access provider has an authentication server 15.

Figure 2A:
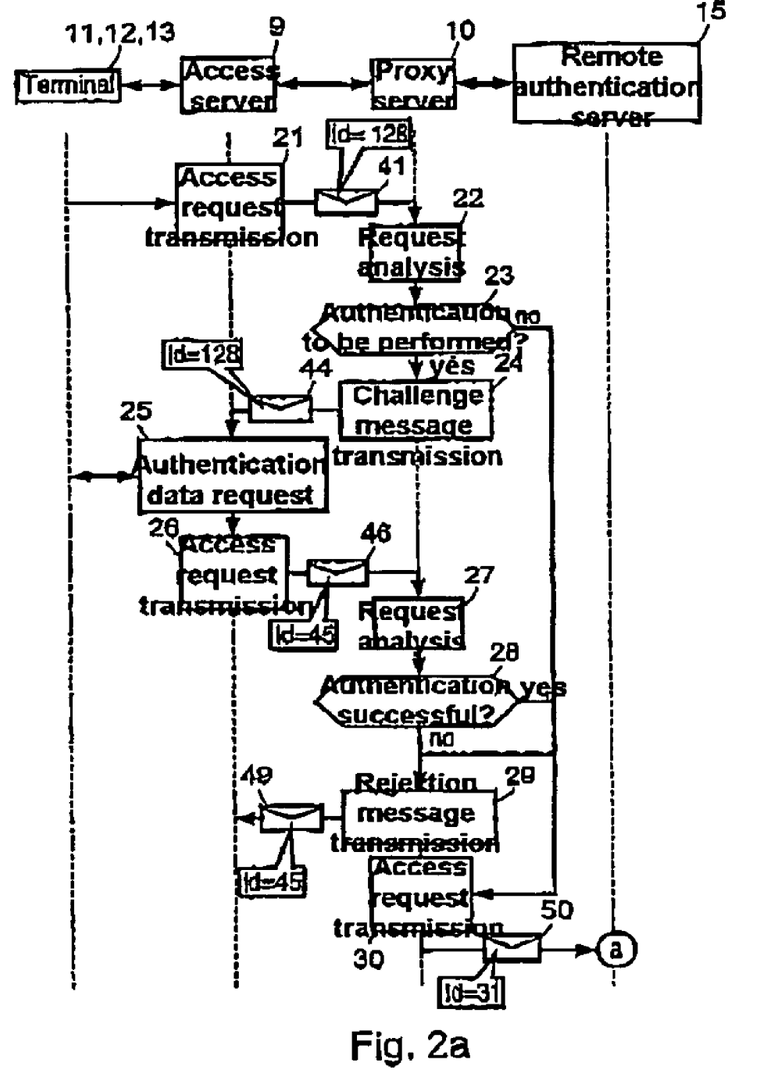
FIGS. 2a and 2b show a diagram of the sequence of steps performed in the system shown in FIG. 1, in accordance with the method of the invention.
Figure 2B:
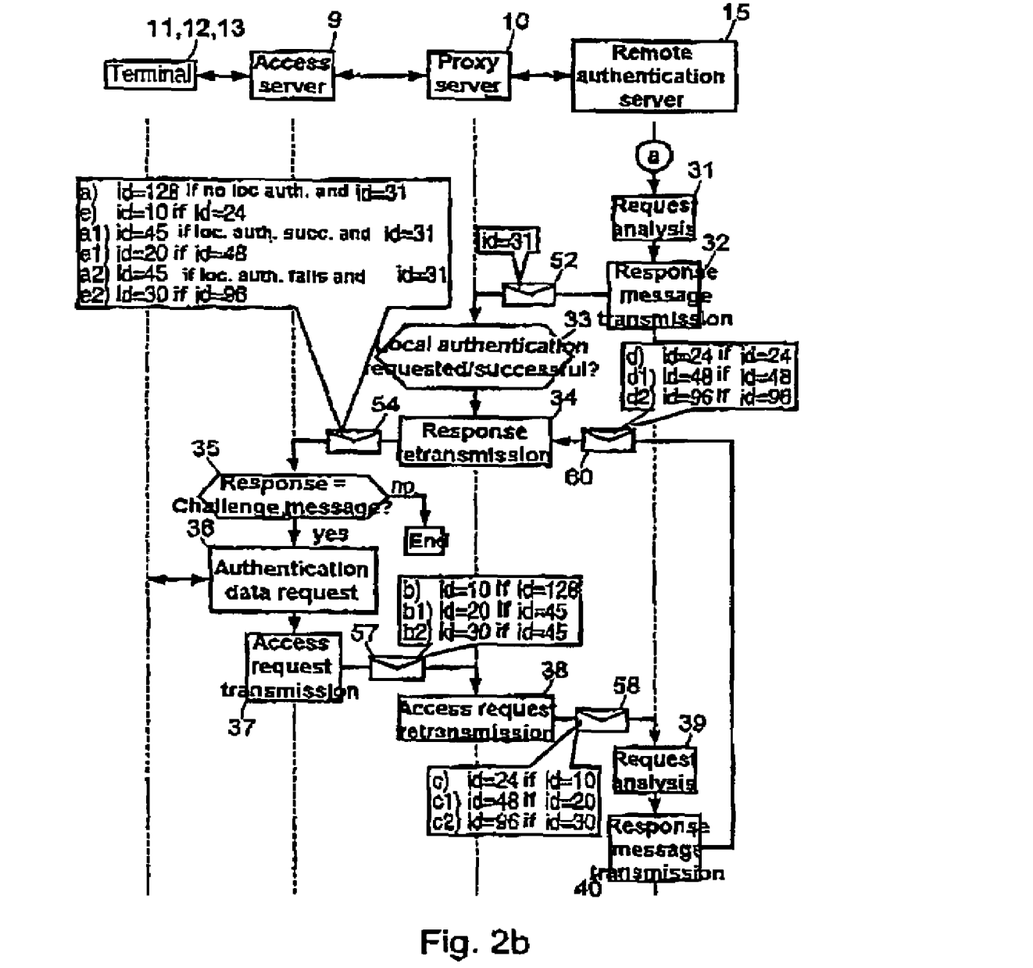

When a user terminal 11, 12, 13 attempts to access the local network, the Internet navigation software is, for example, automatically redirected to a Web server acting as the access server 9, which executes the access authentication procedure shown in FIGS. 2a and 2b.

This procedure is consistent with the RADIUS protocol. Thus, the access server 9 integrates a RADIUS client in order to be capable of receiving RADIUS messages and to respond to them. The proxy server 10 also has all of the functionalities of a proxy as described in the RADIUS standard.

Throughout the following description of the authentication procedure, the RADIUS request or message identifiers used are given by way of example. In the RADIUS standard, the term "type" refers to the type of message.

In the first step 21, the access server 9 transmits, to the authentication proxy server 10, located in the local administrative domain, a RADIUS access request 41 comprising an identifier equal to 128. Upon receipt of such a message in step 22, the proxy server 10 stores and analyzes the contents of this message to determine whether the user must be locally authenticated (step 23).

Thus, a local authentication can, for example, be initiated if the access request comes from a specific local network, or on the basis of user identification information contained in the request.

If the user must be locally identified, the proxy server 10 transmits, to the access server 9 in step 24, a RADIUS access challenge message 44, of the RADIUS Access-Challenge type, comprising an identifier equal to 128. This message also contains an unpredictable value, for example, generated randomly by the proxy server 10 or by a separate device that can be an authentication center, and an attribute specifying the source of the message, namely the local administrative domain. To this end, it is possible to use the "Vendor-Specific" attributes, or the "State" or "Reply-Message" attributes stipulated by the RADIUS protocol.

In the next step 25, the access server 9 receives the challenge message 44, identifies the transmitter of the message using the attribute specifying the source of the message, and therefore asks the user to provide it with a response to the local authentication request. This response can contain a response value obtained by applying, to the random value contained in the challenge message, a predefined cryptographic algorithm involving a secret key specific to the user, wherein the proxy server has means for determining whether the response value corresponds to the random value and the secret key of the user.

In the next step 26, the access server transmits, to the proxy server 10, a new access request 46 containing the response to the local authentication request, of the RADIUS Access Request type containing an identifier equal to 45.

In the next step 27, the proxy server 10 receives, from the access server, the response to the local authentication, provided by the user, verifies it and stores it. If in the next step 28, the response is invalid (local authentication failed), the proxy server can perform another authentication attempt by repeating the procedure beginning with step 24. If the local user authentication does not succeed after a predefined number of attempts, the proxy server 10 can, depending on the local administration policy, send the user, by means of the access server 9, a RADIUS access reject message, or continue the procedure with step 30 to enable the user to be authenticated by a remote authentication server 15 implemented by a service or access provider to which the user wants access.

If, in step 23, the user does not need to be locally authenticated, the procedure is also continued in step 30. In this step, the proxy server 10 transmits, to a remote authentication server 15 with which the user wants to be authenticated, an access request 50, of the RADIUS Access-Request type containing an identifier equal to 31, if the server 15 is a RADIUS server. This message consists of the information contained in the access request 41 stored by the proxy server 10 in step 22.

In the next step 31, the remote authentication server 15 receives and analyzes this message to determine the right of access to the service requested by the user. In the next step 32, the authentication server transmits a response message 52, which can be an acceptance, rejection or challenge message, depending on the authentication information contained in the message 50 received. Thus, in accordance with the RADIUS protocol, the message 52 can be an Access-Accept, an Access-Reject or an Access-Challenge type and contains an identifier equal to 31 corresponding to the identifier of the message 50 received.

The next steps of the procedure are dependent on two conditions (step 33), namely whether or not the local authentication of the user was previously requested, and if the local authentication was requested, whether it succeeded or failed.

If the authentication was not previously requested, the proxy server 10 that receives the message 52, processes this message in step 34 and sends a message 54 to the access server 9. This message 54 corresponds to a response to the message 41 transmitted in step 21 by the access server. These messages comprise, for example, the identifier 128 (case a in FIG. 2b). Thus, if the message 52 transmitted by the remote authentication server 15 is an acceptance message (RADIUS Access-Accept), the proxy server 10 sends the access server 9 an acceptance message (RADIUS Access-Accept). If the message 52 transmitted by the remote authentication server 15 is a rejection message (RADIUS Access-Reject), the proxy server 10 sends the access server 9 a rejection message (RADIUS Access-Reject) or an acceptance message depending on the local policy of the proxy server. The message 52 can also be a challenge message if the user authentication by the remote authentication server 15 failed, or if the latter needs more authentication information or wants to apply a dynamic authentication mechanism. In this case, the message 54 transmitted to the access server is a challenge message (RADIUS Access-Challenge).

Upon receipt of the message 54 in step 35, the access server analyzes the contents of the message, and if it is an acceptance or rejection message, the authentication procedure ends and the access server configures the user's access to the local network 1, 2 and to the IP network 5 according to the response of the proxy server. If the message 54 is a challenge message, the access server asks the user in step 36 to provide a response to the authentication request of the remote administrative domain. In the next step 37, the access server constitutes an access request 57 containing the user's response and sends it to the proxy server 10. This access request is a RADIUS Access-Request message with an identifier equal to 10 (case b in FIG. 2b).

In the next step 38, the proxy server receives the message 57 and retransmits it to the remote authentication server 15 in a request message 58, in the form of a RADIUS message of the Access-Request type with an identifier equal to 24 (case c in FIG. 2b). In the next step 39, the server 15 receives and analyzes the contents of the message 58 and transmits, in the next step 40, a response message 60 of which the content is dependent on the success of the authentication performed by the server 15. This message retains the identifier 24 (case d in FIG. 2b). Thus, the message 60 can be an acceptance message (RADIUS Access-Accept), a rejection message (RADIUS Access-Reject) or a new challenge message (RADIUS Access-Challenge).

The authentication procedure is then repeated starting with step 34, in which the proxy server 10 processes and retransmits the message 60 received to the access server in the form of a message 54. The identifier of the message 60 received, equal to 24, is replaced by 10—so as to correspond to that 57 transmitted by the access server (case e in FIG. 2b).

The authentication procedure ends with step 35 if the message 54 that is transmitted to the access server 9 is an acceptance or rejection message and contains the result of the authentication performed by the remote authentication server 15 (no local authentication). If, is by contrast, the message 54 is a new challenge message, the procedure is continued in step 36.

If, in step 33, the local authentication was requested and succeeded, the procedure including steps 34 to 40 is also performed, but with messages containing different identification numbers (messages corresponding to cases a1 to e1 in FIG. 2b). Thus, the message 52 containing the identifier 31 is transformed in step 34 by the proxy server into a message 54 containing the identifier 45 and the result of the local identification. In step 37, the identifier 45 of the message 57 becomes 20. In the next step 38, the identifier 20 of the message 58 becomes 48. In step 40, the identifier 48 remains unchanged. In the next step 34, the identifier 48 of the message becomes 20.

The authentication procedure ends with step 35 if the message 54 that is transmitted to the access server 9 is of the acceptance or rejection type, containing an attribute specifying the result of the local (successful) and remote authentications. If, by contrast, the message 54 is a new challenge message, the procedure is continued in step 36.

At the end of the authentication procedure, if the remote authentication was successful, the message 54 is an acceptance message, and if it failed, this message can be an acceptance or rejection message depending on the local administration policy.

If, in step 33, the local authentication was requested and failed, the procedure consisting of steps 34 to 40 is also performed, with messages containing different identification numbers (messages corresponding to cases a2 to e2 in FIG. 2b). Thus, the message 52 containing the identifier 31 is transformed in step 34 by the proxy server into a message 54 containing the identifier 45 and the result of the local identification. In step 37, the identifier 45 of the message 57 becomes 30. In the next step 38, the identifier 30 of the message 58 becomes 96. In step 40, the identifier 96 remains unchanged. In the next step 34, the identifier 96 of the message becomes 30.

The authentication procedure ends with step 35 if the message 54 that is transmitted to the access server 9 is of the acceptance or rejection type, containing an attribute specifying the result of the local (failure) and remote authentications. If, by contrast, the message 54 is a new challenge message, the procedure is continued in step 36.

At the end of the authentication procedure, the message 54 that is sent to the access server 9 can be of the acceptance type (even if the local and remote authentications failed) or of the rejection type depending on the local administration policy.

Depending on the result of the authentication procedure, the access server 9 then appropriately configures the user's access and can inform the user of the type of connection he or she is allowed.

Owing to these provisions, the local and remote user authentication procedures are entirely independent. Each administrative domain is therefore completely free to impose an authentication procedure or not.

In an embodiment of the invention, two "Vendor Specific" attributes of RADIUS messages stipulated in the protocol are used. The first of these two attributes, called "Local_Challenge" is included in the challenge messages sent by the proxy server 10 to the access server 9. This attribute is used to indicate to the access server whether or not it is the source of the message. Depending on whether or not this attribute is present, the access server specifies to the user whether local or remote authentication is needed to obtain an appropriate response to the challenge message.

The second attribute, called "Auth_Status" is included in the acceptance messages sent by the proxy server to close the user authentication procedure and to indicate, to the access server, the local and remote authentication results.

This procedure is perfectly suitable for access to the Internet by means of a WLAN-type open local network, for example Wi-Fi, of which the access is controlled by its owner. This local network can provide local services, such as information providing services at the site where the local network is accessible, for example, plans, lists of useful addresses, and so on. To access the Internet, the users who connect to this local network must also request access from their access provider.

When a user equipped with a terminal is in the area of coverage of the local WLAN network, and starts up the navigation software, it is automatically redirected to a Web server of the local access network 9. In a welcome page of the Web server, the users are asked to enter an identifier and a password for access to the local network if they have one. If they want to access the Internet, they must select an access provider from a list, then enter an identifier and a password for access corresponding to the access provider selected.

The information entered by the user is transmitted by the access server 9 to the proxy server 10 of the local network.

If the user entered an identifier and a password for access to the local network, the proxy server 10 of the local network initiates the local identification procedure and stores the result of this authentication. It then initiates the procedure for authentication of the user with the authentication server 15 of the access provider selected by the user.

According to the result of the local and remote authentications, the proxy server sends and acceptance message or a rejection message if the local and remote authentications both failed. In the latter case, the access server does not authorize the user to access local or remote services.

If the user was authenticated only locally or only by the access provider, the access server gives him or her access only to the corresponding services. If both authentications were successful, the access server provides the user with access to both the local and remote services.

Similarly, if the user did not request local authentication, only a remote authentication is performed, and, if this is successful, the access server configures access for the user to the Internet.

The quality of service QoS assigned to the user in the local network can also be adjusted by the access server 9 according to the result of the local authentication.

The invention claimed is:

1. A method for managing the authorization of access of a user terminal connected to an access network to an IP transport network, wherein a proxy server connected to the IP transport network implements the steps of:
   transmitting a RADIUS access request in accordance with the RADIUS protocol, to a remote authentication server of an IP service or access provider indicated in the access request, said access request having been transmitted, upon the request of said terminal, by an access server of the access network;
   transmission to the access server of the user's authentication response provided by the remote authentication server, said proxy server also implementing steps for:
   determining, for said RADIUS access request received from an access server upon the request of said terminal, whether local authentication of said user must be performed at the level of the access network before said step of transmitting said RADIUS access request to said remote authentication server,
   if a local authentication of said user must be performed, transmitting, by means of said access server, to said terminal, a message requesting authentication data,
   upon receipt of a response message from said terminal containing the authentication data requested, executing a local user authentication procedure, on the basis of said authentication data received.

2. The method according to claim 1, wherein the authentication data request transmitted by the proxy server to the user terminal if a local user authentication must be performed, is a challenge message containing a random number.

3. The method according to claim 2, wherein the challenge message contains an indication enabling the user terminal to determine whether it concerns a local user authentication.

4. The method according to claim 1, wherein the proxy server determines which access rights to assign to the user on the basis of the result of the local user authentication and the authentication response provided by the remote authentication server.

5. A computer program including program code instructions for implementing the steps of the method for managing authorization of access of a user terminal according to claim 1 when said program is run on a computer.

6. A system for managing authorization of a user during an attempt by a user terminal to access an IP service or access provider by means of an IP transport network, which system includes:
   at least one access network to which the user terminal is connected,
   at least one IP gateway ensuring the connection, respectively, between the access network and the IP transport network,
   at least one access server of the access network, designed to transmit, upon the request of the terminal, a RADIUS access request in accordance with the RADIUS protocol,
   at least one remote authentication server associated with said IP service or access provider designed to authenticate said user on the basis of authentication data contained in an access request received by the remote authentication server, and
   a proxy server connected to the IP transport network, designed to retransmit a RADIUS access request, transmitted by the access server upon the request of a terminal, to a remote authentication server of an IP service or access provider indicated in the access request, and to retransmit, to the access server, the user's authentication response provided by the remote authentication servers the proxy server includes:
   means for determining, for said RADIUS access request received from said access server upon a user's request, whether a local authentication of the user must be performed at the access network level before transmitting said RADIUS access request to said remote authentication server,
   means, activated if the local authentication of said user must be performed, for transmitting by way of said access server, to said terminal, a message requesting authentication data,
   means, activated upon receipt of a response message from said terminal containing the authentication data requested, for executing a local user authentication procedure, on the basis of said authentication information received.

7. The system according to claim 6, the proxy server also includes means for determining an overall authentication result on the basis of the local user authentication result and the user's authentication response provided by the authentication server, and for retransmitting the overall authentication result to the access server.

8. The system according to claim 7, wherein the proxy server includes means for determining which access rights to assign to the user on the basis of the overall authentication result.

9. The system according to claim 6, wherein each access server includes a RADIUS client and the proxy server includes a client and a RADIUS server, for exchanging messages in accordance with the RADIUS protocol.

10. The system according to claim 6, wherein the authentication data request message transmitted by the proxy server to locally authenticate the user is a challenge message, wherein the proxy server comprises means for generating a random number that is inserted into the challenge message, and means for verifying the response to the challenge message received from the user terminal.

11. A proxy server for managing authorization of access of a user terminal connected to an access network, to an IP transport network, wherein the proxy server is connected to an IP transport network and includes:
- means for transmitting a RADIUS access request in accordance with the RADIUS protocol, to a remote authentication server of an IP service or access provider indicated in the access request,
- said access request having been transmitted, upon the request of said terminal, by an access server of the access network;
- means for transmitting, to the access server, the user's authentication response provided by the remote authentication server, said proxy server also includes:
- means for determining, for said RADIUS access request received from said access server upon the request of said terminal, whether a local authentication of said user must be performed at the access network level before transmitting said RADIUS access request to said remote authentication server,
- means, activated if a local authentication of said user must be performed, for transmitting, by way of said access server, to said terminal, a message requesting authentication data,
- means, activated upon receipt of a response message from said terminal containing the authentication data requested, for executing a local user authentication procedure, on the basis of said authentication information received.

* * * * *

UNITED STATES PATENT AND TRADEMARK OFFICE
CERTIFICATE OF CORRECTION

PATENT NO. : 7,665,129 B2  Page 1 of 1
APPLICATION NO. : 10/588707
DATED : February 16, 2010
INVENTOR(S) : Carpy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this

Twenty-eighth Day of December, 2010

David J. Kappos
*Director of the United States Patent and Trademark Office*